US006059151A

United States Patent [19]

Fuchs

[11] Patent Number: 6,059,151

[45] Date of Patent: May 9, 2000

[54] MEDIA DISPENSER

[75] Inventor: Karl-Heinz Fuchs, Radolfzell, Germany

[73] Assignee: Ing. Erich Pfeiffer GmbH, Radolfzell, Germany

[21] Appl. No.: 09/148,360

[22] Filed: Sep. 4, 1998

[30] Foreign Application Priority Data

Sep. 11, 1997 [DE] Germany ........................... 197 39 990

[51] Int. Cl.[7] .............................. G01F 11/36; B67D 5/40

[52] U.S. Cl. .................................... 222/321.6; 222/321.9; 222/385; 222/402.1

[58] Field of Search ............................. 222/321.6, 321.1, 222/321.7, 321.9, 383.1, 385, 402.1

[56] References Cited

U.S. PATENT DOCUMENTS

| | | | |
|---|---|---|---|
| 3,391,647 | 7/1968 | Corsette et al. | 103/188 |
| 4,694,977 | 9/1987 | Graf et al. | 222/259 |
| 4,934,568 | 6/1990 | Fuchs | 222/321.6 |
| 5,377,881 | 1/1995 | Jouillat | 222/321 |
| 5,711,484 | 1/1998 | Blette et al. | 222/402.1 |
| 5,884,814 | 3/1999 | Fuchs et al. | 222/321.2 |
| 5,927,559 | 7/1999 | Boomer et al. | 222/189.09 |

FOREIGN PATENT DOCUMENTS

| | | |
|---|---|---|
| 0 771 734 A1 | 5/1997 | European Pat. Off. . |
| 42 10 225 A1 | 9/1993 | Germany . |
| 19606703 A1 | 8/1997 | Germany . |
| 296229983 U1 | 12/1997 | Germany . |

OTHER PUBLICATIONS

U.S. application No. 08/887,023, Fuchs, filed Jul. 02, 1997.
U.S. application No. 08/628,603, Fuchs, filed Apr. 11, 1996.
German search report in Appln. No. 197 39 990.8, dated Apr. 03, 1998.

*Primary Examiner*—Kevin Shaver
*Assistant Examiner*—Keats Quinalty
*Attorney, Agent, or Firm*—Quarles & Brady LLP

[57] ABSTRACT

A positioning mechanism (10) with positioning members (42, 42) is located entirely within a discharge stud (7). The positioning members (42, 43) are intermeshed together through fine threads formed on the members (42, 43). An actuator (20) operates on a return stroke to open an outlet valve (19) for a short time to vent medium spaces (12, 13). The positioning mechanism (10) is adjusted to control the metered discharge of the media. A suction tube (24), a reservior seal (25) and a reservoir fastener (26) are also included within the positioning mechanism (10) in a preassembled unit (30).

29 Claims, 1 Drawing Sheet

FIG. 2
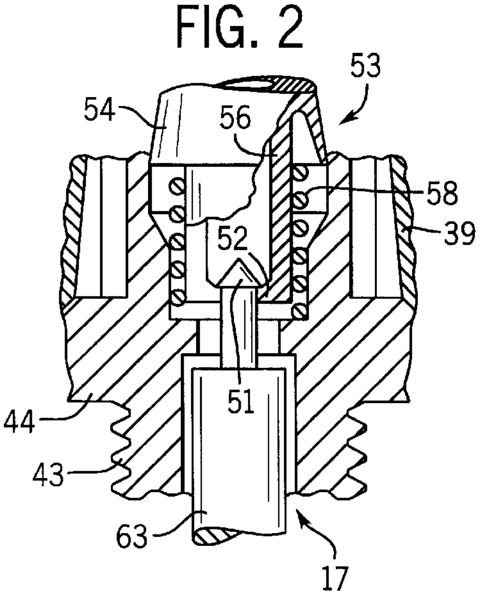
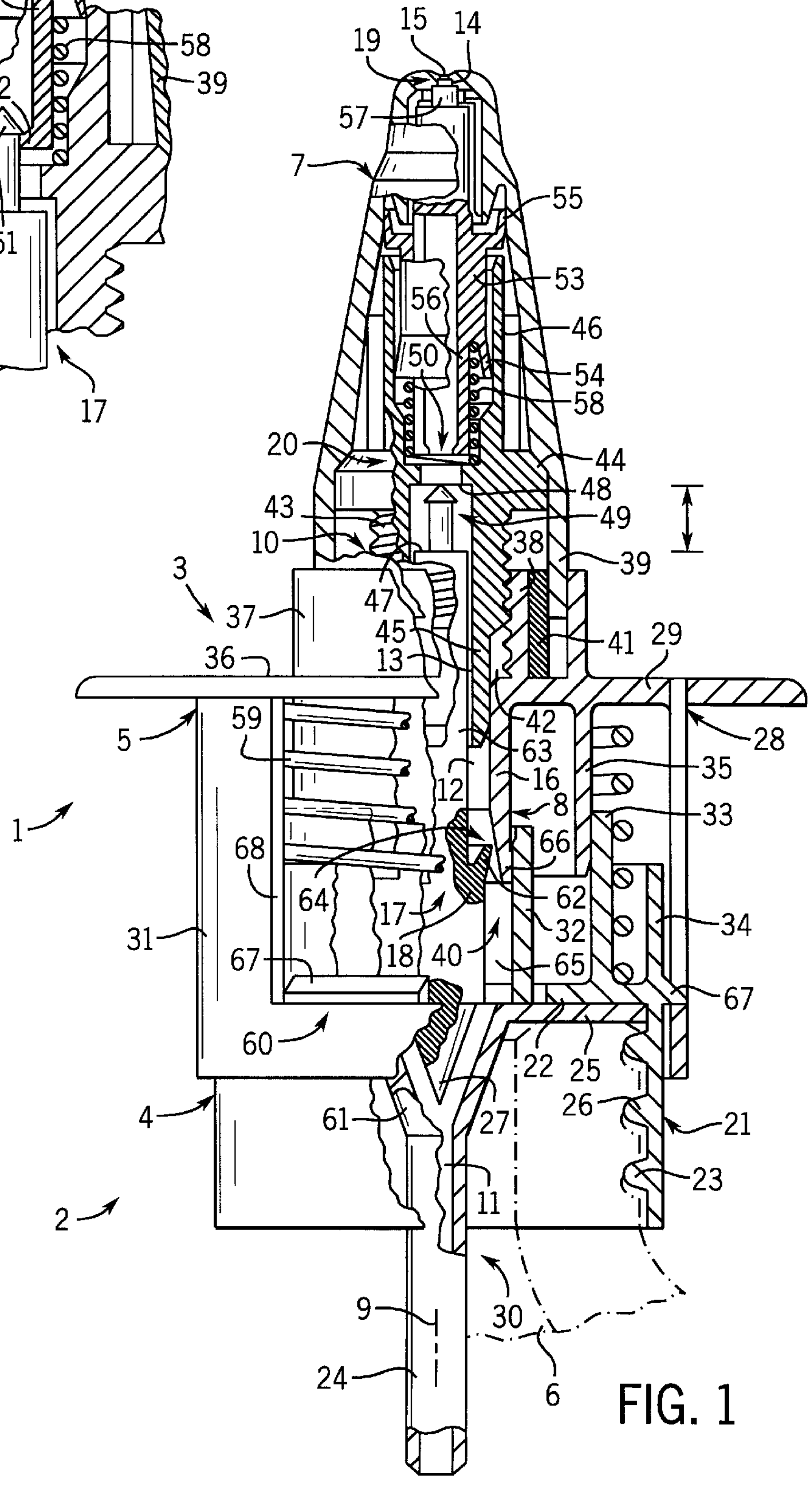
FIG. 1

MEDIA DISPENSER

TECHNICAL FIELD AND BACKGROUND OF THE INVERSION

The invention relates to a dispenser with which flowable or other media, for example liquid, pasty powdery or gaseous media can be stored, delivered or discharged at a medium outlet to separate from the dispenser. The dispenser may be freely carried by the user in one hand and simultaneously actuated by the same hand, i.e. single-handedly with a force conveying the medium.

The dispenser may be configured for refilling its pressure chamber with the medium, for example from a medium reservoir and suck the medium on the return stroke. The dispenser may also be a single-use dispenser to be actuated via but a single pump stroke oriented only in a single direction and containing the full medium volume stored in its pressurizing chamber right from the start. This medium may also then be discharged metered by a single stroke or by a sequence of partial strokes from the pressure space. The pressure chamber housing can be provided on the unit which is movable of shiftable with the medium outlet.

OBJECTS OF THE INVENTION

An object of the invention is to obviate the disadvantages of known configurations. Another object is to ensure precise or variable metering whilst providing non-tiltable bearing of its dispenser units, a tight seal, a substantially smooth outer surface or high functional reliability.

SUMMARY OF THE INVENTION

According to the invention encapsulated stop and/or positioning means are provided for fixing or varying a stroke path, for mechanically positively controlling a flow or pressure compensation valve by manual actuation, for combining elements grouped together to an assembly unit for connecting the dispenser to a support body and/or for sealingly engaging the two dispenser units apart from the pressure chamber. Thereby e.g. the discharge volume of each stop-limited working stroke or stroke path can be precisely defined or varied. Furthermore the dispenser can be simply secured to the carrier, for example a bottle whilst enabling to be adapted to different bottle shapes. Furthermore residuals of the medium at the medium orifice can be sucked back into the dispenser behind the valve seat of an outlet valve at the end of media discharge whilst de-aerating the pressure chamber. Also ingress of foreign substance, such as dirt into the dispenser is prevented by simple means.

Setting the stroke path is done by turning or axially displacing a discharge head relative to the associated base body which forms an actuating cap for manually actuating the dispenser. Thereby the handle can always remain in the same rotational position relative to the first base body irrespective of the setting of the positioning means.

The flow valve may be provided separately from the positioning means or connected thereto, e.g. by sealingly guiding a movable valve body on one of the positioning members. This positioning member together with the valve body provides a preassembled unit to be inserted into the second base body or discharge head. The first dispenser unit contains a freely projecting driver which is to be connected to the valve body via a snap-coupling engaging and disengaging exclusively as a function of the mechanical load or force and positively translating the valve body into the desired valve position, for example the open position. Thereafter the coupling connection is reseparated as a function of the force and the valve element returned to its other valve position by spring force. In this way, air is able to flow, e.g. via the medium outlet and the outlet duct, out of the pressure chamber during only a first portion of the return stroke of the dispenser.

The dispenser comprises a fastener body, such as a cap, for its connection to a reservoir. Projecting from the inside of this fastener are connecting members. They include a riser or suction tube freely projecting into the reservoir, a seal, a fastener member for positively engaging the reservoir and/or a body bounding the pressure chamber. At least two up to all of these members form a preassembled or one-part unit to be secured to the dispenser or to the first base body. Accordingly, by changing this unit the dispenser can be adapted to greatly different shapes of reservoirs or to the flow properties of various media. To bound the pressure chamber e.g. a cylinder jacket and a plunger are provided, each of which may belong to the unit. However, this bound may also bound other medium spaces and where necessary form the driver or a coupling member of the valve actuator.

The second dispenser unit provided as actuator unit is sealingly guided at the first dispenser unit by circumferential faces or the like such as sliding faces in such a way that inner spaces of the dispenser located outside of the press chamber are sealed off from the environment. The seal is provided in the vicinity of multiple, separate annular zones formed by nested, shell-shaped projections which are radially spaced from each other. Thereby separate, nested annular spaces are achieved which are sealed from each other in the rest or initial position and/or over the stroke path. Thus an outermost shell can be provided with a window-type port for guiding a cam or the like without dirt being able to enter beyond the next projection located in this outermost shell.

Also means are provided for de-aerating the medium spaces, like the pressurizing chamber, the medium outlet and all medium spaces adjoining each other inbetween to permit quickly filling these medium spaces with medium by a priming action on first-time operation of the dispenser. For that the valve actuator as explained is suitable which maintains the outlet valve open over a partial path of the return stroke so that the compressed air can easily emerge without having to also maintain the outlet valve open against a valve spring. Venting the medium reservoir for equalizing the pressure for the amount of medium discharged in each case can be achieved via a further valve which is opened or closed by manual actuation. For example, it may be closed in the rest position of the dispenser and open in all other stroke positions. The vent duct passing through the valve may then entirely bypass the medium spaces.

BRIEF DESCRIPTION OF THE DRAWINGS

Example embodiments of the invention are explained in more detail in the following and illustrated in the drawings in which:

FIG. 1 illustrates a dispenser according to the invention partially in a side view, partially in axial section, in the rest position of the discharge actuator and in a median position of the setting means and FIG. 2 is a sectional view on a magnified scale taken from FIG. 1 but shortly after commencement of the return stroke.

DETAILED DESCRIPTION

The dispenser 1 comprises first and second dispenser units 2, 3 movable linearly and axially relative to each other. Each comprises an integral base body 4, 5. Dispenser 1 is devised for being secured to a carrier or medium reservoir 6 which then forms a component of first unit 2 or of first base body 4 and which may also be configured integrally with the latter.

Second base body 5 of second unit 3 comprises a discharge head 7 which may be in one part with base body 5, but is here a separate, oblong cap-shaped component providing a stiff section or body. Totally encapsulated within bodies 4, 5 is a medium pump 8, namely a thrust piston pump with which the medium is sucked abruptly from the reservoir 6 on its return stroke and then discharged on the working stroke. From the rest position units 2, 3 are to be moved relative to each other manually over the working stroke up to the stroke end against spring force so that the dispenser 1 is shortened. The cited parts are located in a central dispenser axis 9. Where necessary, except for springs, such as return springs, all components of the dispenser 1 may be made of a plastics material, e.g. as injection molded components.

Stop or positioning means 10 serve to precisely define and to vary the amount of medium discharged by the corresponding working stroke. The end of the working stroke is stop-limited and the amount of medium discharged is varied by altering the length of the stroke path. The working stroke following in each case may connect codirectional to the end of the preceding working stroke if no return stroke or no return spring is provided. At the end of each working stroke the dispenser 1 may also be returned to its rest position likewise defined by a stop and then reactuated over the next working stroke. Means 10 are located totally in unit 3 or in base body 5 so that unit 2 can be easily replaced without any change of the means 10.

Extending juxtaposed from reservoir 6 up to a medium outlet 15 are medium paths or medium spaces internally passing through units 2, 3 symmetrically to the axis 9. Protruding from base body 4 freely and counter flow direction into reservoir 6 is an inlet duct 11. Duct 11 issues by an annular passage section into an annular pressure or pump chamber 12 of metering pump 8. This chamber 12 comprises an axial section having enlarged flow cross-sections and an axial section 13 directly adjoining the latter in flow direction which has significantly smaller flow cross-sections as the connecting duct. Adjoining the latter in flow direction is a widened axial section and then a constricted axial section which in the vicinity of a duct closure connects to an outlet duct 14 in flow direction. Outlet duct 14 is formed exclusively by a nozzle duct of an atomizer nozzle which forms by its downstream end medium outlet 15, is bounded in one part and traverses only a single end wall of head 7. Therefore, the outlet duct 14 is exceptionally short. It has a length which is maximally two or three times its largest width.

As chamber bounds pump 8 comprises a cylinder 16 and a plunger unit 17 with a plunger 18 sealingly shiftable in cylinder 16. Cylinder 16 is fixedly or in one part connected to base body 5 and freely projects counter flow direction into body 4. Piston 17 is fixedly or in one part connected to body 4 so that unit 17 projects freely in flow direction into body 5. Unit 17 may be secured and axially supported on body 4 upstream of piston 18 in the vicinity of only a single end face. Unit 17 may also be formed by a separate component inserted in or counter flow direction in the body 4.

The cited duct closure is formed by an outlet valve 19 opening and closing as a function of pressure up to the valve seat of which the press chamber 12 may extend valveless. The valve seat is formed by the inner face of the cited end wall of head 7 and is thus located at the inner end of duct 14. In addition to actuating the valve as a function of pressure, actuating means 20 are provided for automatically or positively open valve 19 on commencement of the return stroke and to reclose it during the remaining portion of the return stroke by spring force. During this valve opening air is able to exhaust through ducts 14, 15 from spaces 12, 13 into the open whilst piston 18 still tightly seals off chamber 12. Once medium spaces 12 to 14 are then filled completely with non-compressible medium, opening the valve serves to suck the medium back from ducts 14, 15 into the dispenser. As a result medium residuals and where applicable a small amount of air are brought behind the closure 19 into chamber 12 whilst entirely emptying the duct.

Body 4 forms a fastening flange or a cap 21 having an end wall 22 and a jacket 23 in which the constricted neck of reservoir 6 is axially fixedly located and tensioned. A riser tube 24 freely projects counter flow direction from the inside of end wall 22 into the reservoir 6. Tube 24 bounds in one part the upstream end part of duct 11 from its inlet opening up to wall 22. Conduit 24 may be in one part with body 4 or can be a separate component which is inserted in flow direction into cap 21 linearly and then directly supported by wall 22 beyond which it does not project in flow direction. Adjoining the inside of wall 22 is also an annular disk-shaped seal 25 which is axially tensioned between wall 22 and the end face of the reservoir neck whilst being in one part with tube 24.

Located at the inner circumference of jacket 23 is a fastening member 26 projecting radially inwards, for example a screw thread, an annular snap-action cam or the like which for mutually tensioning bodies 4, 6 axially positively engages a counter member at the outer circumference of the reservoir neck and may be spaced from both ends of jacket 23. Member 26 is in one part with the body 4 but may also be in one part with the member 24 or seal 25. The outer circumference of member 24, 25 then transits into a shell oriented counter flow direction which adjoins the inner circumference of jacket 23 and is connected thereto axially fixedly via a resilient snap-connector. The snap-cam protrudes radially inwards from jacket 23 and/or from the outer circumference of the inner shell (not shown) and positively engages in each case in a snap-detent of the opposing circumferential face. With this inner shell the dispenser 1 may be mounted on a reservoir neck with a screw thread, and without inner shell on a reservoir neck having a snap-member which is engaged fixedly by the snap-member of jacket 23. Wall 22 may also be an annular disc flange without shell 23 or be secured to the reservoir neck by a crimp ring.

A core or guide body 27 freely protrudes counter flow direction from the inside of wall 22 to engage inside the reservoir neck, and duct 11. Over the length of body 27 the reservoir neck or duct 11 is annular. Body 27 is tapered acutely conically counter flow direction and the jacket of tube 24 is flared in flow direction with the same conical angle in this portion. Thereby between the widest end and body 25 a passage is formed which traverses body 25. Thereby flow cross-sections of duct 11 are widened in flow direction and up to chamber 12. The parts 24, 25 form a preassembled unit 30 to be fixed to body 4 and axially locked by snap-connector. Unit 17 may belong to unit 30.

Also body 5 forms a cap 28 for receiving the downstream end of body 4. This cap 28 comprises an end wall 29 and a jacket 31 freely projecting therefrom exclusively counter flow direction. In shell 31 body 4 is permanently engaged in a snug fit. Projecting from wall 22 exclusively in flow direction are three jacket projections 32, 33, 34 spaced from each other radially and located coaxially nested. Sleeve-shaped shells 32 to 34 are in one part with body 4.

Projecting from wall 29 exclusively counter flow direction are three jacket projections or sleeve-shaped shells which are likewise radially spaced from each other and coaxially nested. The innermost shell is formed by jacket 16 and the outermost shell is formed by the cap shell 31. Shell 35 is located between shells 16, 31. All shells 16, 31, 35 are in one part with body 5. The axially mostly protruding one of shells 32 to 34 is middle shell 33, it being the outermost shell 34 that protrudes least. Shell 34 may have the same outer and inner width as shell 23. Projecting by the same extent from wall 29 in flow direction only are two projections or sleeve-shaped jackets 37, 38 spaced from each other radially, coaxially nested, in one part with body 5 and shorter than shells 16, 31shell 35 and shell 38 wit with shell 35 and shell 38 with shell 32 or 16. Wall 29 may project radially outwards beyond shell 31 or extend only up to shell 31. Wall 29 forms by its outside and around members 37 to 39, 41 to 43 and 63 a finger-pressure handle 36.

The upstream end of head 7 forms shell 39 having cylindrical inner and outer circumferences permanently engaging wall 29 and fixedly or in one part connected with the remote end wall of head 7. Via guiding or sealing means 40 bodies 4, 5, and head mutually permanently engage movably so that no air can enter medium spaces 12, 13 except via the duct 11 or port 15. Instead via a duct completely bypassing medium spaces 11 to 15 atmospheric air is able to flow into the constant-volume reservoir 6 through bodies 4, 5.

Between body 5, and head 7 a sleeve-shaped elastomeric seal 41 is radially pretensioned. Seal 41 sealingly contacts the outer circumference of shell 38 and the smooth inner circumference of shell 39. The inner and outer width of cylindrical shell 41 is constant over the full length. It may form a frictional drag so that head 7 is turnable relative to body 5 about axis 9 only when overcoming the drag force. Head 7 is conically constricted at an acute angle toward nozzle opening 15 located in axis 9. Head 7 is suitable for insertion into a bodily or nasal opening or for dispensing a medical treatment medium into the open eye. This requires the dispenser 1 to be used upside down with the discharge outlet 15 oriented downwards.

Irrespective of discharge actuator means 10 comprise two positioning members 42, 43 which interengage to be mutually continuously displaceable parallel to axis 9. Members 42, 43 are mutually rotatable about axis 9. Member 42 is only slightly widened relative to the piston's slide on cylinder 16. Member 42 is formed by the inner circumference of shell 38 and thus axially fixedly connected to body 5. Member 43 is formed by a body separate from head 7 or shell 39. Member 43 is fixedly connected to shell 39 both axially and about axis 9. Members 43, 39 could also be in one part. Members 42, 43 intermesh directly by sloping faces, for example fine threads having a pitch of less than three or one millimeter. So any rotary motion of head 7 results in it being displaced axially relative to body 5.

Unit 2, 4 forms near to the downstream end of unit 17 an annular stroke stop 47 to which on head 7 or body 43 an annular counter-stop 48 is associated. So by mutually abutting the shoulder faces 47, 48 the maximum stroke path or length of the working stroke is defined. Faces 47, 48 are located in axis 9 or exclusively within bodies 5, 43 and permanently downstream of wall 29. Means 10 are shown in a median position from which the stroke path can be elongated and shortened. Faces 47, 48 are located in chamber 12, namely connecting downstream directly to narrow duct 13 and located in the widened duct section. Faces 47, 48 are mutually axially adjustable by positioning means 10 when in the rest position. In a single-use dispenser a coarse pitch thread or a stepped connecting link could be provided instead of a fine thread.

Member 43 transits into a widened annular collar 44 at the downstream end of its thread. Collar 44 fixedly engages the inner circumference of shell 39. So projection or sleeve 45 protrudes freely from the upstream end of sleeve-shaped member 43. Sleeve 45 traverses wall 29 and extends into shell 16 toward piston 18. The end face of sleeve 45 permanently directly opposes the end face of piston 18, but does not abut on piston 18 at the stroke end. The inner circumferential face of sleeves 43, 45 is constant throughout up to stop 48 and bounds duct 13. The outer circumferential face of shell 45 is smaller in width than that of the adjoining thread and may sealingly engage the inner circumference of cylinder 16, while being axially shiftable and rotatable therein, i.e. in the cylinder run for piston 18. The thread mesh of the setting thread may also be sealed in a labyrinth-type seal. Furthermore, the engagement of retaining collar 44 in shell 39 is sealed.

In flow direction a sleeve projection 46 juts from collar 44 without contact into the tapered section of shell 39 which like sleeve 43, 45 is longer than its outer width. Sections 43, 44, 45, 46 are axially fixedly interconnected or in one part. Axial ribs or the like on the outer circumference of sleeve 46 may bear equispaced on the inner circumference of shell 39 for radially tensioning and centering sleeve 46.

For briefly opening and automatically closing valve 19 a slave actuator or driver 49 is provided on unit 5, 17 and formed by the downstream end of unit 17. Driver 49 is permanently entirely located within body 43 to 46. In the initial position of units 2, 3 driver 49 is a core body within the widened chamber section which it forms and bounds annularly in the center. Driver 49 comprises a counterhooking-type snap-member 51 of a drive or snap-coupling 50. The second coupling or snap-member 52 thereof is provided on the axial reciprocatingly shiftable valve body 53 of valve 19.

Valve body 53 comprises two seal or piston lips 54, 55 mutually axially spaced, counterdirectionally freely protruding and annular. Upstream lip 54 slides permanently sealed on the inner circumference of sleeve 46 and downstream lip 55 slides permanently sealed on the inner circumference of shell 39. The end wall of lip 55 may form a stop which on valve opening comes up against the end face of sleeve 46, thereby defining the maximum opening travel of the valve 19.

The upstream end of the body 53 comprises a sleeve-shaped finger or mandrel 56 freely projecting upstream from lips 54, 55 counter flow direction towards driver 49, thus opposing the latter permanently directly with member 52. Member 52 projects as an annular cam radially inwards beyond the inner circumference of finger 56 with which it is resiliently spreadable. Member 52 is located directly adjacent to an end wall of body 43, 46. The upstream end face of this wall faces away from member 52, forms stop 48 within collar 44 and the wall is traversed by a constricted passage port. Driver 49 moves into and through this port on pumping stroke in a snug fit by its member 51 until the dimensionally rigid snap-member 51 first latches into engagement with member 52 whereafter faces 47, 48 close the outlet of the upstream section of chamber 12 like a valve. Thus valve 19 closes instantly.

On start of the return stroke driver member 51 executes a short idle travel relative to member 52, right then abuts against member 52, takes along body 53 counter flow direction and thereby opens valve 19 up to abutment. Connecting thereto and after the smaller portion of the return stroke member 51 is torn out of member 52 by the axial return forces. Member 52 is thereby resiliently widened. On being released by member 51 valve element 53 is returned by a spring 58 in flow direction, whereby valve 19 is closed.

The return forces for units 2, 3 are caused by a spring 59, like a coil or compression spring, which is located totally remote from medium spaces 11 to 15 and engages between shells 33, 34 as well as 31, 35 so that its ends are directly supported against walls 22, 29. Coil or compression spring 58 surrounds the axially slotted mandrel 56 and member 52. Spring 58 is supported permanently pretensioned with one end on the inner end wall of body 43 to 46 and with the other end within lip 54. Spring 58 protects members 52, 56 from excessive widening.

Downstream of lip 55 body 53 comprises a mandrel which is slimmer than lip 55, which projects in flow direction freely within shell 39 and which transits at the end into an even slimmer mandrel or end section 57 forming the movable closing face of valve 19. This annular closing face is flanked as an sharp-angled edge by the cylindrical circumferential face and the planar end face of mandrel 57. In the closing position the exclusively linearly movable closing face is in contact with the valve seat formed by the inner face of the end wall of head 7.

Sections 54 to 57 are axially fixedly connected to each other and in one part with valve body 53. The flow path of the medium passes axially through body 53 up to the interior of the lip 55 and then emerges radially into interior of lip 55. From there this path is guided further along the outer circumference of the downstream finger of body 53 to the valve seat. This section of the flow path is bounded by the outer circumference of the downstream finger and by the inner circumference of shell 39. Directly adjoining the valve seat upstream thereof swirler or whirl means may be provided with guide passages oriented radially inwards to port into a central swirl chamber bounded by the downstream finger and the inner side of the end wall of head 7. By means of this swirler the medium is finely atomized on leaving outlet 15. In adjusting positioning means 10 with one hand clasping head 7 bodies 7, 43, 53 57 are corotated whilst driver 49 does not rotate.

To mutually lock units 2, 3 or bodies 4, 5 against axial separation and against rotation locking means 60 are provided. The locking members thereof are directly arranged on shells 23, 34 or 31. Thereby rotational orientation of unit 3 relative to reservoir 6 is always the same. Also withdrawal of unit 3 from unit 2 in flow direction is positively prevented solely by this lock 60. Corresponding withdrawal of head 7 from units 2, 3 is positively prevented solely by the adjoining thread or the like. Head 7 can thus be totally removed without damage from unit 3 by unscrewing it therefrom, e.g. for filling reservoir 6 with medium through the cylinder 16. However, to prevent this detachment head 7 may also be locked by an end stop.

Piston 18 has a single annular piston lip 62 freely projecting in flow direction and sealingly running on the inner circumference of cylinder 16. In the rest position lip 62 is lifted out of contact from the inner circumference because the latter is conically widened at an acute angle at its end and counter to flow direction. Freely projecting in flow direction beyond piston lip 62 is a cylindrical mandrel 63 of unit 17. Mandrel 63 bounds with its outer circumference medium spaces 12, 13 and carries at its downstream end the reduced driver 49. Driver 49 freely projects from end face 47 of mandrel 63 by a slimmer mandrel section, at the end of which a widened and acutely angled conical head provides coupling member 51. Parts 18, 27, 43, 63, 49, 51 are axially fixedly connected to each other and may be in one part. At the transition between piston 18 and body 27 unit 17 forms a ring shoulder located in the plane of the inside of wall 22 and partly covering the widened end of the annular section of duct 11. Thus a constriction or throttle point is achieved. It is at this point that tube 24 forms a funnel end widened at an acute angle in flow direction. Relative to end 61 unit 17 may be free of contact. The upstream end of piston 18 may also be secured to at least one of bodies 4, 22, 24, 25, 32 by snap-members distributed about its circumference. Thereby piston 18 can be in one part with shell 32.

By ring lip 62 and the inner circumference of cylinder 16 an inlet valve 64 is formed which in initial position is open and after a first part of the working stroke is closed due to lip 62 then running against the conical section of cylinder 16. Adjoining this valve seat upstream is an annular presuction chamber 65 bounded by piston 18 and shell 32. Priming chamber 65, like shell 32, traverses wall 22 and directly adjoins the annular end of duct 11 upstream. On closure of valve 64 the working stroke compresses the medium in chamber 12 up to the control space within lip 55. Thus, once a limit pressure is exceeded valve element 53 is displaced against spring 58 and the medium discharged through opened valve 19 until the mechanical or manually actuated valve 47, 48 closes at the end of the stroke.

The free end of shell 16 forms an annular piston or sealing lip 66 freely projecting counter flow direction, sliding on the inner circumference of shell 32 and bounding chamber 65 by its inner circumference. Lip 66 is located permanently upstream of lip 62. The sealing compression or expansion of lips 54, 55, 62, 66 increases with increasing medium pressure within medium spaces 11 to 14 so that a tight seal is assured. Lip 66 is in one part with shell 16. An equivalent sealing lip could also be provided by shell 35 for sealed guidance on the inner circumference of shell 33. Like shells 34, 31 also shells 33, 35 permanently overengage each other.

Air may also be fed between shells 33, 35 into the annular space between shells 32, 33 and from there through wall 22 into reservoir 6. Thereby in rest position shells 33, 35 form a tight closure for this venting path. The closure may be a valve which is closed only in the rest position and open in all other stroke positions. Thereby one valve body is in one part with shell 33 and the other valve body in one part with shell 35. On the actuating stroke the pressure in the annular space between shells 16, 32, 33, 35 is slightly increased, thus resulting in a pumping action.

At the outer circumference of shells 23, 34 or of wall 22 body 4 comprises at least one radially projecting cam 67. Body 5 comprises in shell 31 through openings or windows 68 distributed circumferentially, extending from wall 29 up to the vicinity of the open cap end of cap 28 and traversing wall 29 as slots. One of cams 67 engages in each port 68 thus forming a resilient snap-connection with mutually displaceable snap-members 67, 68 for interconnecting bodies 4, 5. This snap-connection simultaneously forms lock 60 since cam 67 abuts against the upstream bound of window 68 at the end of the return stroke. Cam 67 is stationary relative to axis 9 and comprises an inclined shoulder which runs against the cap end of body 5 on assembly, then resiliently widens shell 31 before then snapping into place in port 68. Components 5 to 7, 16 to 18, 21 to 24, 26 to 29, 31 to 39, 42 to 49, 53, 56, 57, 61, 63 and 67 may be inherently or dimensionally rigid. Head 7 projects beyond wall 29 by a length which is at least equivalent to its outer diameter or multiply longer.

Seal 41 ends flush with the free end faces of projections 37, 38. If air for venting reservoir 6 needs to be germ-free, filter means or germicidal means are fixedly arranged in the path or in the annular space between shells 32, 33. For instance, a flat disk or ring-shaped germ filter may adjoin shells 32, 33 radially tensioned and support with its end face against the outside of wall 22. Wall 22 at the junction to the outer side of shell 32 as well as seal 25 are traversed by vent opening issuing into the reservoir space along end section 61.

All features, properties and effects cited may be precisely or merely substantially or roughly as explained and may also greatly depart therefrom depending on the medium to be discharged. Partial bodies described as being in one part with each other may also be formed by separate components and connected to each other in their mutual transition or connecting zones by connecting members, e.g. by a weld, a snap-connection or the like. The description of the positioning members may also apply to the stop members and vice-versa. The discharge device may also be used for precisely discharging even minutely dispensed amounts, e.g. 5 $\mu$l.

Reference is made to U.S. Pat. No. 4,694,977 and U.S. patent appl. Ser. No. 08/628,603 filed Apr. 11, 1996; U.S. Pat. No. 5,884,814 issued Mar. 23, 1999; U.S. Pat. No. 5,927,559 issued Jul. 27, 1999; and U.S. patent appl. Ser. No. 08/887,023 filed Jul. 2, 1999, all of which are assigned to the assignee of the present invention, as disclosing further details of the dispenser of the present invention. Dispenser 1, the reservoir 6 of which comprises but a single reservoir port, namely that for inserting unit 2 and has no drag piston, may be converted for upside-down operation simply by omitting tube 24. Then in upside-down position the medium flows from the reservoir through wall 22 directly into chamber 65. This is helpful when the medium needs to be delivered into an eye or a nasal passage with the patient's head tilted backwards. The dispenser 1 then does not protrude into reservoir 6, or, where necessary, merely by lug 27.

What is claimed is:

1. A dispenser for discharging media comprising:

a dispenser base including first and second dispenser units (2, 3), said first dispenser unit (2) including a first base body (4) and said second dispenser unit (3) including a second base body (5), said second dispenser unit (3) including a stiff section (7) which is inherently stiff;

a discharge actuator for displacing said second dispenser unit (3) relative to said first dispenser unit (2) over an actuating stroke defining a rest position, a stroke path and a stroke direction;

medium spaces (11 to 15) including a pressure chamber (12), an outlet duct (14) and a medium outlet (15), said medium spaces (11 to 15) defining a flow direction for the media and a counter direction directed counter said flow direction, and control means (10) for positively varying a metered discharge volume of the media.

2. The dispenser according to claim 1, wherein said control means (10) include stop means for variably limiting said stroke path, said stop means including a first stop member (63) with a stroke stop (47) and a second stop member (44) with a counter stop (48) located downstream of said stroke stop (47), said counter stop (48) being inserted into said stiff section (7) in a direction departing from said counter direction.

3. The dispenser according to claim 2, wherein said control means include setting means (10) including first and second setting members (42, 43) for positively varying said stroke path, said first setting member (42) directly and displaceably engaging said second setting member (43), at an intersection said setting means (10) being substantially entirely arranged on said second dispenser unit (3), said first and second setting members (42, 43) being substantially up to fully encapsulated.

4. The dispenser according to claim 3, wherein said first setting member (42) is supported on said second dispenser unit (3) within said stiff section (7), said second setting member (43) including said counter stop (48) and being centered on said second base body (5) axially adjacent said intersection, said second setting member (43) extending inside said stiff section (7).

5. The dispenser according to claim 2, wherein said control means include setting means (10) including first and second setting members (42, 43), a fine thread couple directly interconnecting said first and second setting members (42, 43), said first setting member (42) including an internal thread of said fine thread couple.

6. The dispenser according to claim 2, wherein said stiff section is a discharge head (7) including said medium outlet (15), said second base body (5) including said discharge head (7), said counter stop (48) being inserted into said discharge head codirectional with said flow direction.

7. The dispenser according to claim 6, wherein said second stop member (44) is supported inside said discharge head (7), said pressure chamber (12) including a constricted section and a widened section axially connecting to said constricted section, said second stop member freely projecting codirectional with said counterdirection and toward said widened section.

8. The dispenser according to claim 2, wherein said second stop member (44) is located entirely inside said second base body (5), said stiff section (7) freely projecting in said flow direction.

9. The dispenser according to claim 2, wherein at least one of said first and second stop members (63, 44) bounds said medium spaces (11 to 15) and includes an outer circumferential face sealingly supported on said second base body (5) without threaded engagement.

10. The dispenser according to claim 2 and further including a housing space and sealing means (40) substantially sealingly closing said housing space with respect to environmental atmosphere, wherein said first and second stop members (63, 44) are located inside said housing space.

11. The dispenser according to claim 10, wherein at least one of said first and second dispenser units (2, 3) includes opposing circumferential faces which are mutually displaceable, said sealing means (40) being located between said circumferential faces.

12. The dispenser according to claim 2, wherein a sealing member (41) envelopes said first and second stop members (63, 44).

13. The dispenser according to claim 2 and further including at least one guide body (17, 53) for guiding the media, wherein at least one of said first and second stop members (44) includes at least one of said guide body (17, 53) including a component separate from said at least one of said first and second stop member (44).

14. The dispenser according to claim 13, wherein said at least one guide body (17, 53) is located inside said at least one of said first and second stop member (44) displaceably guiding and supporting said at least one guide body (17, 63).

15. The dispenser according to claim 13, wherein said at least one guide body (17, 53) bounds said medium spaces (11 to 14) and includes at least one of a control body, a valve body (53) of a valve, and a pump piston (18) of a discharge pump (8).

16. The dispenser according to claim 13, wherein said medium spaces (11 to 15) include a guide duct (13) traversing at least one of said first and second stop members (63, 44), said at least one guide body including first and second guide bodies (17, 53) and said guide duct (13) including first and second duct ends, said first guide body (17) being inserted into said guide duct (13) from said first duct end and said second guide body (53) being inserted into said guide duct (13) from said second duct end.

17. The dispenser according to claim 2, wherein said second base body (5) includes a pump cylinder (16) and said first base body (4) includes a pump piston (18) displaceable inside said pump cylinder (16), said second base body (5) being traversed by said medium outlet (15).

18. The dispenser according to claim 1, and further including a valve (19) and a valve actuator (20) for opening said valve (19), wherein said valve actuator (20) includes a driver (49) for mechanically opening said valve, said valve (19) including at least one of a vent valve for venting a medium reservoir (6), and an outlet valve for letting the media pass to said medium outlet (15).

19. The dispenser according to claim 18, wherein said valve (19) includes a valve body (53) displaceable relative to a valve seat, a snap coupling (50) being included and including a first snap member (51) providing said driver (49) said snap coupling (50) including a second snap member (52) commonly displaceable with said valve body (53), said first snap member (51) gripping said second snap member (52) for opening said valve (19).

20. The dispenser according to claim 19 and further including a piston unit (17) bounding said pressure chamber (12) and including a downstream end, wherein said first snap member (51) is located at said downstream end and said second snap member (52) is located at an upstream end of said valve body (53).

21. The dispenser according to claim 18, wherein said driver (49) is located substantially outside said first base body (4) and inside said second base body (5).

22. The dispenser according to claim 18, wherein said control means (10) include first and second setting members (42, 43) for positively varying said stroke path, said driver (49) being permanently located inside at least one of said first and second setting members (42, 43).

23. The dispenser according to claim 1 and further including an assembly unit including at least two connector members for connecting said dispenser (1) to a media reservoir, wherein said connector members include at least two of:

a riser tube (24) for transferring the media from the media reservoir (6) to said pressure chamber (12), a seal (25) for sealing the media reservoir (6), a fastener (26) for tensioning said first dispenser unit (2) against the media reservoir (6), and a bound (18) bounding said pressure chamber (12).

24. The dispenser according to claim 23, wherein said riser tube (24) includes a downstream end connecting to said seal (25) and said bound (18).

25. The dispenser according to claim 23, wherein said first base body (4) includes a transverse wall (22) oriented transverse to said flow direction, said at least two connector members (24 to 27) being located substantially entirely upstream of said transverse wall (22).

26. The dispenser according to claim 1 and further including a riser tube (24) for transferring the media from a media reservoir (6) into said pressure chamber (12), wherein said riser tube (24) bounds an inlet duct (11) and has a downstream end, a guide projection (27) projecting into said inlet duct (11) codirectional with said counter direction.

27. The dispenser according to claim 1 and further including a flange wall (22) for tensioning said dispenser against a reservoir neck, wherein said flange wall defines a downstream side, said first base body (4) including said flange wall (22) and engaging members (33) substantially permanently sealingly engaging said second base body (5) outside said medium spaces (11 to 15), said engaging members (33) being located at said downstream side.

28. The dispenser according to claim 1 and further including a jacket projection (16) bounding said pressure chamber (12) and including a sealing face (66), wherein said first base body (4) includes a stand jacket (32) slideably engaging said sealing face (66).

29. The dispenser according to claim 1 and further including an actuating cap (28) of said discharge actuator including a handle (36), wherein said second base body (5) includes said actuating cap (28) and said handle (36), said actuating cap (28) including a cap end wall (29) and a cap jacket (31) internally receiving said first base body (4), within said cap jacket (31) at least two jacket projections (16, 35) projecting from said cap end wall (29) and including circumferential faces, said circumferential faces of said at least two jacket projections (16, 35) and of said cap jacket (31) being guided on said first base body (4).

* * * * *